(12) United States Patent
Watanabe et al.

(10) Patent No.: US 6,519,405 B1
(45) Date of Patent: Feb. 11, 2003

(54) POSITIONING SUBSTRATE FOR AN OPTICAL DEVICE AND POSITIONING METHOD USING THE SUBSTRATE

(75) Inventors: Tsutomu Watanabe, Yokohama (JP); Eisuke Oki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 74 days.

(21) Appl. No.: 09/672,897

(22) Filed: Sep. 29, 2000

(30) Foreign Application Priority Data

Sep. 30, 1999 (JP) .......................................... 11-280071

(51) Int. Cl.[7] ................................................ G02B 6/00
(52) U.S. Cl. ...................................... 385/136; 385/147
(58) Field of Search ................................ 385/134, 136, 385/137, 52, 65, 71, 83, 97, 147

(56) References Cited

U.S. PATENT DOCUMENTS 5,671,315 A * 9/1997 Tabuchi et al. ............. 385/137

FOREIGN PATENT DOCUMENTS

| JP | 2-146507 | 6/1990 |
|----|----------|--------|
| JP | 5-157928 | 6/1993 |
| JP | 2685153  | 8/1997 |

* cited by examiner

Primary Examiner—Lynn Field
Assistant Examiner—Son V. Nguyen
(74) Attorney, Agent, or Firm—McDermott, Will & Emery

(57) ABSTRACT

An optical waveguide positioning substrate having a simple construction and which is easy to maintain, and a positioning method using this substrate, which can be applied to various types of optical component having different numbers of optical waveguides. An optical waveguide positioning substrate (1) has an array body (2) provided with an optical component placing part (5) for aligning an optical component (for example an optical fiber cable S) having an optical waveguide (for example an optical fiber F) and a plurality of light-emitting parts (15), illuminating/extinguishing of each of which can be freely selected, disposed at an end of the array body in the length direction of the optical component and aligned in the width direction of the optical component.

5 Claims, 5 Drawing Sheets

POSITIONING SUBSTRATE FOR AN OPTICAL DEVICE AND POSITIONING METHOD USING THE SUBSTRATE

BACKGROUND OF THE INVENTION

1. Field of the Invention

This invention relates to a substrate for positioning optical fibers or optical waveguides when the optical fibers or optical devices having the optical waveguides therein are connected together by using a mass fusion-splicing device, and to a positioning method using the substrate.

2. Description of the Related Art

An example of related art in the field of the present invention appears in Japanese Patent No.2685153. A positioning member set forth in this publication has multiple V-grooves for positioning multiple optical fibers. Also, for placing the optical fibers in predetermined V-grooves only among the V-grooves provided, a vertically movable optical fiber guide plate is attached to an end of the V-grooved member.

Slots each having three-stage different widths are formed in this optical fiber guide plate, and it is possible to select any of the widths of the slots by vertically moving the optical fiber guide plate.

By selecting the width of the slots in correspondence with the number of optical fibers, the optical fibers can be placed only in the predetermined V-grooves.

In this way the optical fibers can be positioned in predetermined positions, and resultantly enable good fusion splice.

However, with the optical waveguide positioning substrate of the related art described above, there have been the following problems. Because the optical waveguide guide plate is constructed to move up and down mechanically, it tends not to move smoothly and facilitates the accumulation of dust and the like between the V-grooved member and the optical fiber guide plate, resulting in troublesome maintenance.

While it is essential that dust in the V-grooves is cleared, particularly when optical fiber connection is carried out outdoors, the guide plate constitutes an obstruction during cleaning, and the cleaning operation is difficult.

Japanese Unexamined Patent Application Publication No. H.5-157928 discloses a device which is provided with a light-emitting means for emitting a guide light and an image detecting means and which, on the basis of an optical fiber image detected by the image detecting means and a light source image of the guide light, determines the relative positions of an optical fiber and a V-groove and aligns the optical fiber over the V-groove.

However, this device is complicated, since it also requires a fine adjustment motor for altering the position of the optical fiber, and as a result, its maintenance is again troublesome.

Also, since this device has only one light-emitting part in the width direction and its position is fixed, there is drawback of the unavailability of choice in application.

SUMMARY OF THE INVENTION

It is therefore an object of the present invention to provide a substrate for positioning an optical wave guide which has a simple construction and is easy to maintain, and a positioning method using the substrate. Also, it is another object of the invention to facilitate the positioning of any of the various optical components having different numbers of optical waveguides.

To achieve these objects and other objects, the structural feature of the invention is to provide an array body having an optical component placing part, on which an optical component having optical waveguides is placed, and a plurality of light-emitting parts disposed at an end of the array body in the longitudinal direction of the optical component and aligned in the transverse direction of the optical component such that in each of the light emmiting parts the illuminating/extinguishing can be freely selected.

The light emitted when one or more of the light-emitting parts is selectively illuminated in correspondence with the number of optical waveguides can be used as an index of guidance of the optical component, and the optical component can be placed easily in a suitable position on the optical component placing part.

Preferably, cross-sectionally V-shaped aligning grooves are formed in parallel in the optical component placing part and the light-emitting parts, illuminating/extinguishing of each of which can be freely selected, are disposed at the end of the array body with one-to-one correspondence with at least one of the aligning grooves.

When this kind of construction is adopted, by selectively illuminating/extinguishing the light-emitting parts provided in correspondence with the alignment grooves in accordance with the number of optical waveguides, the positions of predetermined aligning grooves can be specified easily and the optical component can be suitably placed on those aligning grooves. That is, the operation of placing the optical component in predetermined aligning grooves with the naked eye is facilitated.

In another preferable construction, a placing groove having a flat bottom face for aligning the optical component is formed in the optical component placing part, and the light-emitting parts, the illuminating/extinguishing of each of which can be freely selected, are disposed at the end of the placing groove and are aligned in the width direction of the optical component. In this kind of construction, a plurality of suction holes for applying suction to the optical component are preferably provided in the flat bottom face. Also, preferably, the sides of the placing groove are formed with steps so that the width of the placing groove can be selected in accordance with the number of optical waveguides. In this case, the optical component can be placed easily in a desired position by selecting illuminating/extinguishing of the light-emitting parts and using the illuminated lights as a reference.

Preferably, the light-emitting parts are disposed in a line over the entire width of the optical component placing part. In this case, the substrate can be applied to optical components of sizes up to the full width of the optical component placing part.

Also, light sources are preferably provided separately from the light-emitting parts and light from the light sources is guided to the light-emitting parts by light guide members. In this case, the freedom of selection of the disposition and color of the light sources increases, and changes according to the usage state can be carried out easily.

DETAILED DESCRIPTION OF THE PREFERRED EMBODIMENTS

Preferred embodiments of an optical waveguide positioning substrate according to the invention will now be described in detail with reference to the drawings.

Figure 1:
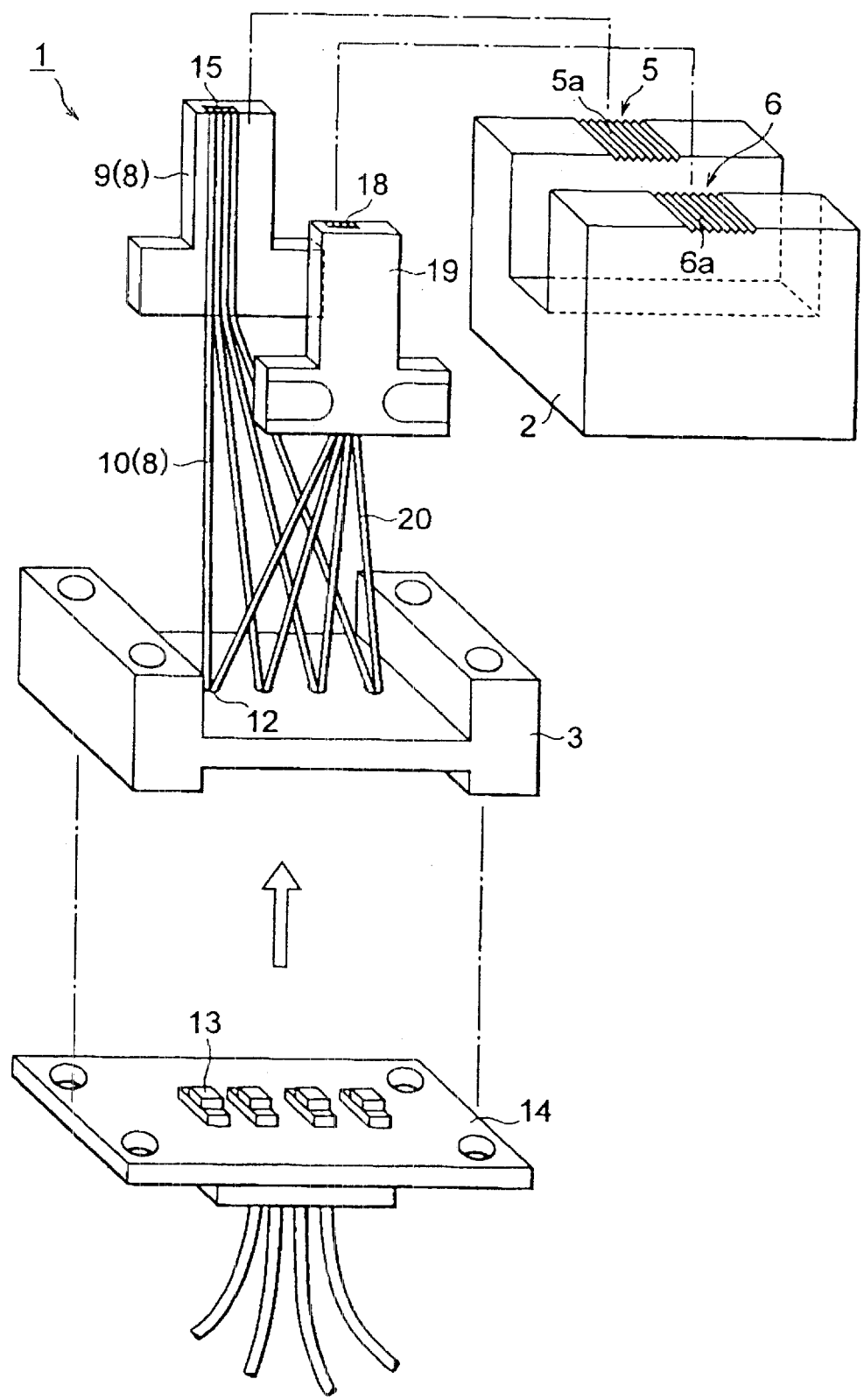
FIG. 1 is an exploded perspective view of a preferred embodiment of the invention, showing a positioning substrate, each part of which is separated.

FIG. 1 is an exploded perspective view of a preferred embodiment of the invention, showing a positioning substrate, each part of which is separated.

This positioning substrate 1 has a ceramic array body 2 for aligning optical fibers F (an example of an optical waveguide) (see FIGS. 2 and 3) projecting from an optical fiber cable S (an example of an optical component). This array body 2 is screwed to an internal plate mounted in a case (not shown).

Thus the array body 2 is suitably mounted by means of screws or the like to a predetermined part (a fusion splicing part, that is, the vicinity of a part where electric discharge is carried out) of a fusion splicing device or the like. The upper part of the array body 2 is formed to two arms, and optical component placing parts 5 and 6 are provided on the upper faces of these arms. Multiple (for example eight to twelve) cross-sectionally V-shaped optical fiber aligning grooves 5a and 6a are formed in parallel in each of the optical component placing parts 5 and 6 in a one-to-one relationship. Corresponding optical fiber aligning grooves 5a and 6a are aligned in a straight line. These ross-sectionally V-shaped optical fiber aligning grooves will hereinafter be called simply "V-grooves".

Also, the positioning substrate I has a light-emitting means 8 which is designed to decrease the number of parts so as to lower manufacturing costs and thereby to reduce the frequency of failures and facilitate cleaning.

This light-emitting means 8 has an optical fiber fixing piece 9 fixed to the array body 2 with adhesive. A plurality of light guide members 10 to be used as light guides are embedded in this optical fiber fixing piece 9 so as to extend vertically. The light guide members 10 are formed of optical fibers having smaller diameter than the groove width of the V-grooves 6a and are aligned so that they each have one end face in the same plane as the upper face of the optical fiber fixing piece 9 to constitute a light-emitting part 15.

Figure 2:
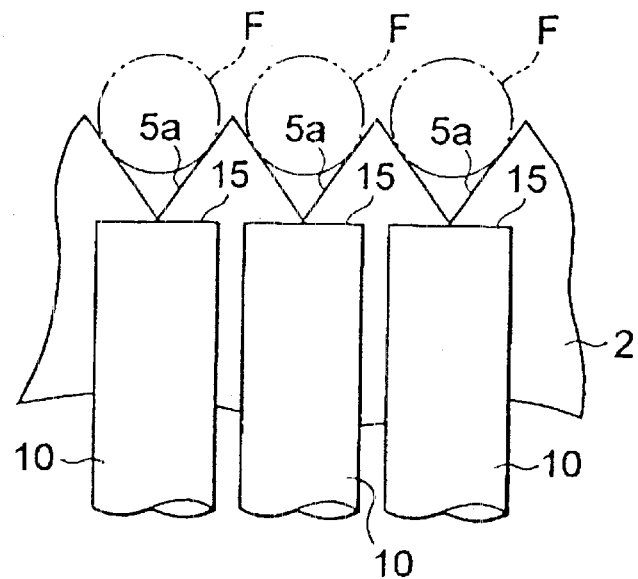
FIG. 2 is an enlarged detailed side view of essential part of the positioning substrate.

As shown in FIG. 2, the light-emitting parts 15 of the light guide members 10 are aligned in one-to-one correspondence with some of the V-grooves 5a. Specifically, when there are eight of the V-grooves 6a, four light guide members 10 are aligned in one-to-one correspondence with half, i.e. four, of the V-grooves 5a (see FIG. 3).

Also, as shown in FIG. 1, base ends of the light guide members 10 are inserted into and fixed with adhesive in through-holes 12 provided in a base table 3. Four green LEDs (light sources) 13 are aligned on a base plate 14 so as to face the four through holes 12. The base plate 14 is fixed to the underside of the base table 3, and by one of the LEDs 13 being disposed at each of the through holes 12, the base ends of the light guide members 10 are positioned in front of the LEDs 13 serving as light sources.

As a result of this construction, it is possible to introduce light into the corresponding light guide member 10 by lighting any of the LEDs, whereupon the light-emitting part 15 of the light guide member 10 corresponding to a predetermined V-groove 5a illuminates. This illumination can be used as a guidance index when an optical fiber F is being set in a V-groove 5a. To allow the optical fibers F to receive a uniform electric discharge energy, the positions in which the light-emitting parts 15 illuminate are changed in correspondence with the number of optical fibers F to change the positions at which the optical fibers F are set in the V-grooves 5a.

For example, to position four optical fibers F in a central region between electrode bars P and P, a predetermined light-emitting part 15 is illuminated among the four light-emitting parts 15, and using this light-emitting position as a target, an optical fiber F at the outermost or the innermost among the four optical fibers F is set in the illuminated V-groove 5a with the naked eye.

This is only an example, and the illuminating position of the light-emitting part 15 is, of course, determined appropriately by the user.

Of course, one may choose either to illuminate/extinguish the light-emitting parts 15 or to change the colors of the light-emitting parts 15.

Figure 3:
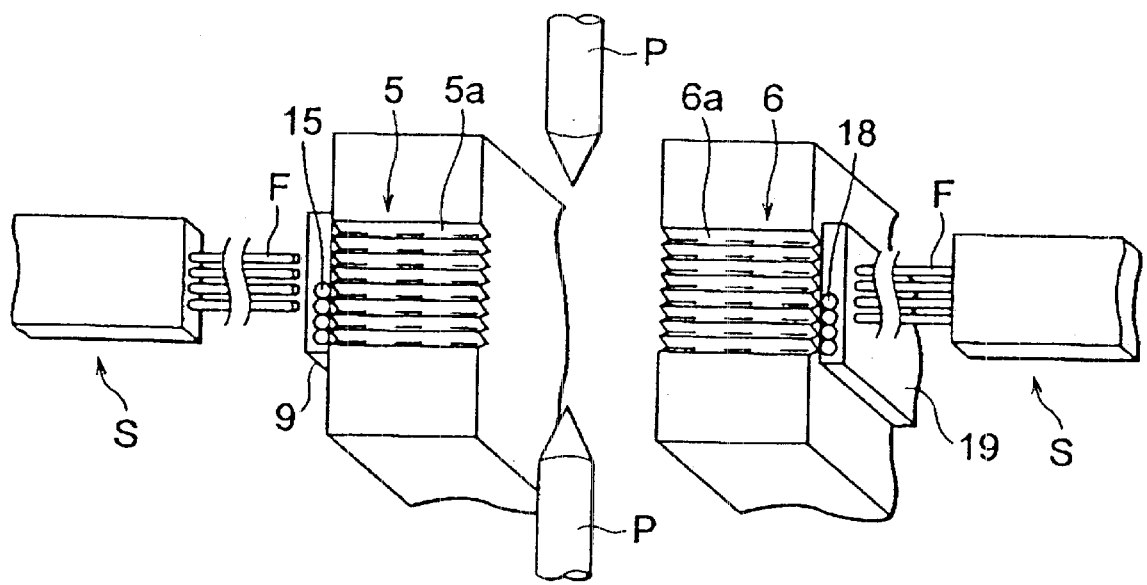
FIG. 3 is an enlarged perspective view of an array body and light-emitting parts shown in FIG. 1.

Although the foregoing description refers to the V-grooves 5a side, it is the same also for the V-grooves 6a used in fusion splicing. That is, as shown in FIG. 1 and FIG. 3, light guide members 20 are aligned in an optical fiber fixing piece 19 with four light-emitting parts 18 thereof disposed in one-to-one correspondence with four of the V-grooves 6a. In this case, the light guide members 20 are fixed in the through holes 12.

Figure 4:
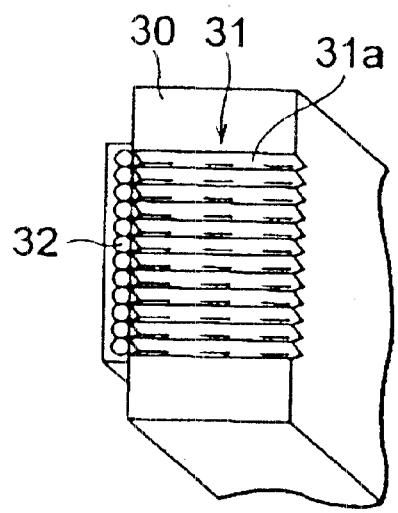
FIG. 4 is an enlarged perspective view showing another preferred embodiment of a positioning substrate according to the invention.
Figure 5:
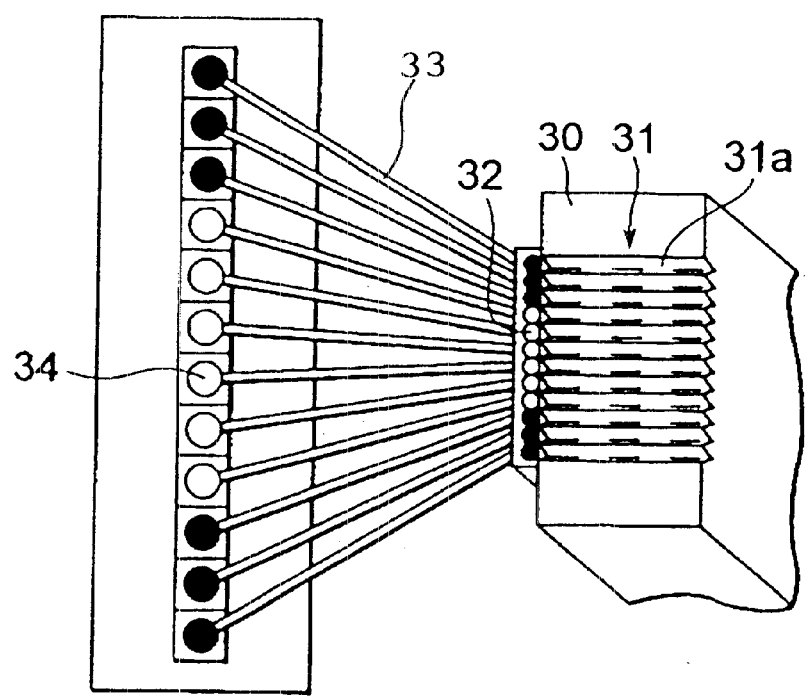
FIG. 5 is a perspective view showing the relationship between an array body shown in FIG. 4 and light sources (LEDs)

Another preferred embodiment will now be described. As shown in FIG. 4, twelve V-grooves 31a are provided in an optical component placing part 31 of an array body 30, and twelve light-emitting parts 32 are provided in a line extending over the full width of the optical component placing part 31 with one-to-one correspondence with the V-grooves 31a. In this case, to correspond with the light-emitting parts 32, as shown in FIG. 5, twelve optical guide members 33 are connected to twelve LEDs 34. As a result, the twelve light-emitting parts 32 can be illuminated/extinguished individually.

Figure 6:
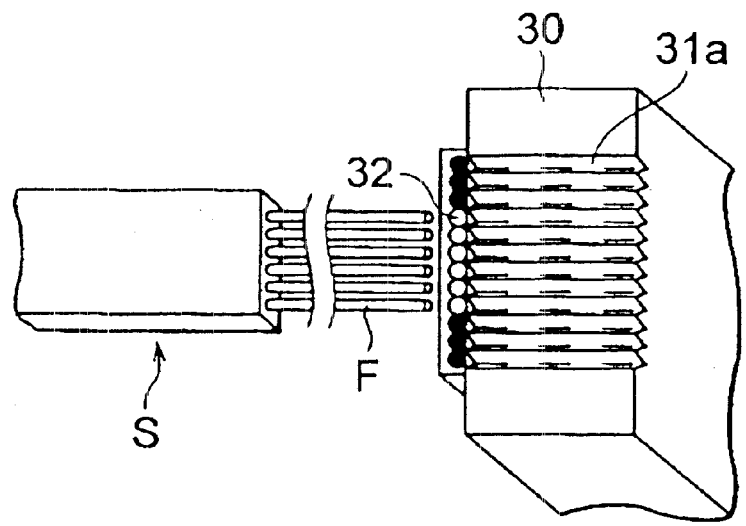
FIG. 6 is a perspective view showing a state of illumination of the light-emitting parts shown in FIG. 4.

With this construction, as shown in FIG. 6 six centrally positioned light-emitting parts 32 are illuminated to correspond with six optical fibers F, and the optical fibers F, are set in the illuminated V-grooves 31a using these illuminated positions as a guide.

Figure 7:
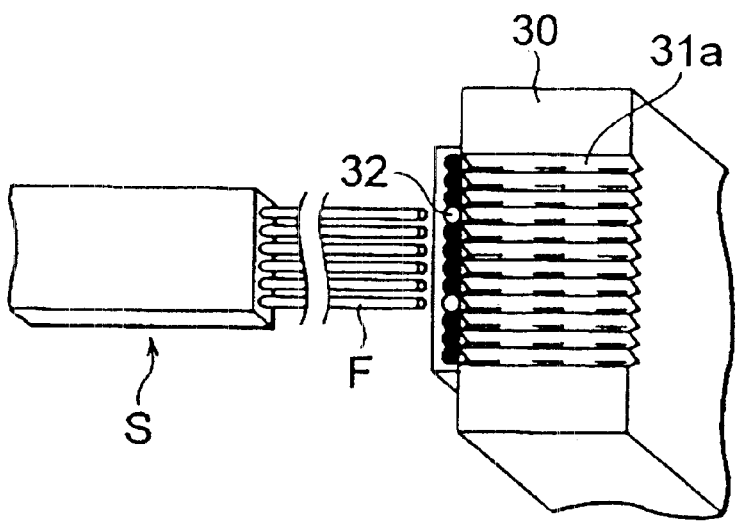
FIG. 7 is a perspective view showing another state of illumination of the light-emitting parts shown in FIG. 4.

Also, as shown in FIG. 7, it is possible for both of the outermost ones of the light-emitting parts 32 of the six centrally positioned light-emitting parts 32 to be illuminated and used as a guide for setting the optical fibers F.

Figure 8:
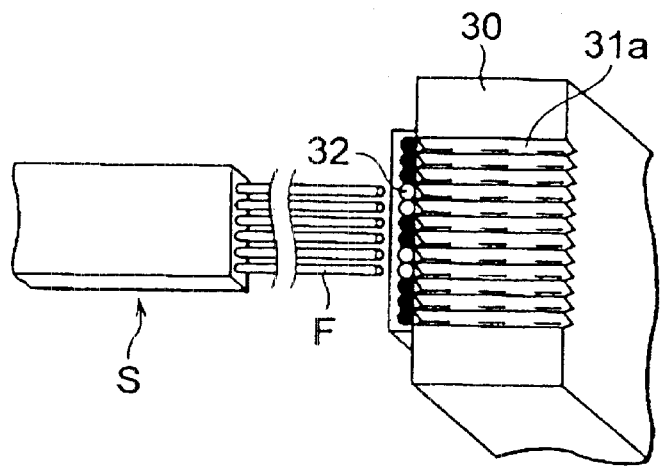
FIG. 8 is a perspective view showing a further state of illumination of the light-emitting parts shown in FIG. 4.

Or, the two outerside light-emitting parts 32 of the six centrally positioned light-emitting parts 32 may be illuminated at each side, as shown in FIG. 8, or the colors of adjacent light-emitting parts 32 may be changed, or illuminating/extinguishing may be selected. Or six of the centrally positioned light-emitting parts 32 may be extinguished and the remaining illuminated. Of course, the location of the illuminated/extinguished light-emitting parts 32 are changed appropriately in accordance with the number of optical fibers F.

Figure 9:
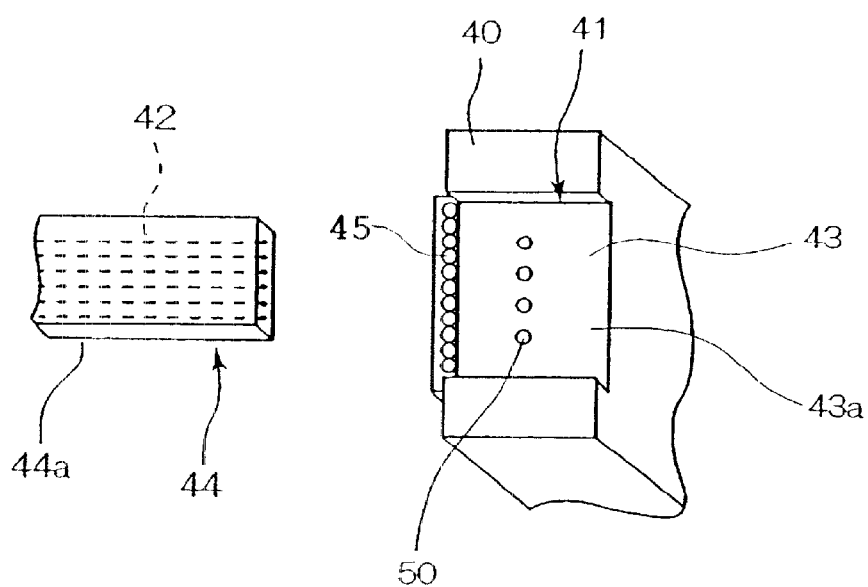
FIG. 9 is an enlarged perspective view showing another preferred embodiment of a positioning substrate according to the invention.

A further preferred embodiment will now be described. As shown in FIG. 9, a cross-sectionally U-shaped optical device placing groove 43 for aligning an optical device 44, which is an example of an optical component having six optical waveguides 42 formed inside it, is formed in an optical component placing part 41 of an array body 40. When the optical device 44 is disposed on this optical component placing part 41, the bottom face 44*a* of the optical device 44 is made to abut with the bottom face 43*a* of the optical device placing groove 43. In the array body 40, at an end of the optical device placing groove 43, multiple (twelve) light-emitting parts 45 are provided in a line extending over the full width of the optical device placing groove 43. The number of light-emitting parts 45 is freely determinable, and the form of illumination of the light-emitting parts 45 is the same as that described hereinbefore. Also, suction openings 50 can be provided in the bottom face 43*a* of the optical device placing groove 43 and the optical device can be held in the optical device placing groove by vacuum suction from the other side of these holes.

Figure 10:
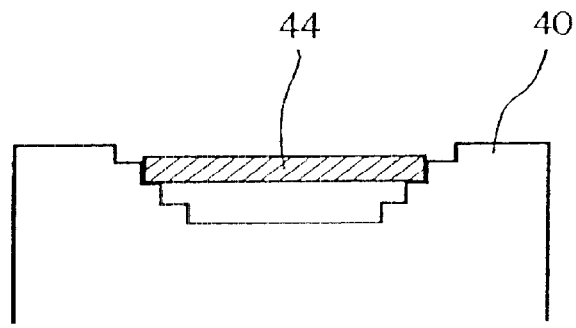
FIG. 10 is a cross sectional view showing another preferred embodiment of a positioning substrate according to the invention.

And, as shown in FIG. 10, the inner wall surface of the placing groove can be formed to have steps and suitable widths of the placing groove in accordance with the number of optical waveguides before the optical device is placed.

The invention is not limited to the foregoing preferred embodiments.

For example, any suitable color of the light-emitting parts can be chosen, and their number is also freely determinable.

This positioning substrate is used not only in a fusion splicing device having left and right optical device placing parts, but also in a fusion splicing device having only one optical device placing part, and it can be applied to various devices. The invention also can be used in cases for single-core fibers.

What is claimed is:

1. An optical waveguide positioning substrate, comprising:
   an array body having an optical component placing part on which an optical component having at least one optical waveguide is to be placed; and
   a plurality of light-emitting parts disposed at an end of the array body in a longitudinal direction of the optical component and aligned in a transverse direction of the optical component, wherein:
   illuminating/extinguishing of the plurality of light-emitting parts can be freely selected,
   a plurality of cross-sectionally V-shaped aligning grooves are formed in parallel in the optical component placing part, and
   the light-emitting parts are disposed at the end of the array body with one-to-one correspondence with at least one of the aligning grooves.

2. An optical waveguide positioning substrate according to claim 1, wherein an optical component placing groove having a flat bottom face for aligning the optical component is formed in the optical component placing part and the light-emitting parts are disposed at an end of the optical component placing groove.

3. An optical waveguide positioning substrate according to claim 1, wherein the light-emitting parts are provided in a line extending over the full width of the optical component placing part.

4. An optical waveguide positioning substrate according to claim 1, wherein light sources are provided separately from the light-emitting parts and light from the light sources is guided to the light-emitting parts by light guide members.

5. An optical waveguide positioning method using the optical waveguide positioning substrate of claim 1, wherein at least one of the plurality of light-emitting parts is illuminated in correspondence with a width of the optical component.

\* \* \* \* \*